US009223998B1

(12) United States Patent
Grisso (10) Patent No.: US 9,223,998 B1
(45) Date of Patent: Dec. 29, 2015

(54) SYSTEM AND METHOD FOR ENHANCING DATA SECURITY BY USE OF DYNAMIC HONEY TOKENS

(71) Applicant: NETSUITE INC., San Mateo, CA (US)

(72) Inventor: Ryan Grisso, San Francisco, CA (US)

(73) Assignee: NetSuite Inc., San Mateo, CA (US)

( * ) Notice: Subject to any disclaimer, the term of this patent is extended or adjusted under 35 U.S.C. 154(b) by 0 days.

(21) Appl. No.: 14/179,160

(22) Filed: Feb. 12, 2014

Related U.S. Application Data (60) Provisional application No. 61/776,268, filed on Mar. 11, 2013.

(51) Int. Cl.
*G06F 21/62* (2013.01)

(52) U.S. Cl.
CPC ...................................... *G06F 21/62* (2013.01)

(58) Field of Classification Search
CPC ...................................................... G06F 21/62
See application file for complete search history.

(56) References Cited

U.S. PATENT DOCUMENTS

| 8,880,435 | B1 * | 11/2014 | Catlett et al. | ..................... 705/75 |
| 2012/0233222 | A1 * | 9/2012 | Roesch | ......................... 707/812 |

OTHER PUBLICATIONS

Maheswari, V., Sankaranarayanan, P.E., "Dynamic Honeytokens", Journal of Computer Applications, vol. 1, No. 3, Jul.-Sep. 2008.*
Grimes, A. Roger, "Beyond honeypots: It takes a honeytoken to catch a thief", InfoWorld, Apr. 16, 2013.*
Bercovitch et al., "HoneyGen: an Automated Honeytokens Generator", IEEE, 2011.*
McRae, Craig M., and Rayford B. Vaughn. "Phighting the phisher: Using web bugs and honeytokens to investigate the source of phishing attacks." System Sciences, 2007. HICSS 2007. 40th Annual Hawaii International Conference on. IEEE, 2007.*
Chakravarty, Sambuddho, et al. "Detecting traffic snooping in Tor using decoys." Recent Advances in Intrusion Detection. Springer Berlin Heidelberg, 2011.*

\* cited by examiner

*Primary Examiner* — Mohammad L Rahman
(74) *Attorney, Agent, or Firm* — Lane Powell PC (57) ABSTRACT

Systems and methods for enhancing the security of confidential data such as customer email lists or similar contact information. Specifically, the invention is directed to a method of inserting a form of data referred to as a honey token into a data set when it is accessed by a user (such as an employee of the rightful owner of the data). In contrast to conventional forms of such tokens, the inventive token is dynamically generated and includes information identifying the user (i.e., the party accessing the data).

16 Claims, 3 Drawing Sheets

SYSTEM AND METHOD FOR ENHANCING DATA SECURITY BY USE OF DYNAMIC HONEY TOKENS

CROSS REFERENCE TO RELATED APPLICATION

This application claims the benefit of U.S. Provisional Application No. 61/776,268, entitled "System and Method for Enhancing Data Security by Use of Dynamic Honey Tokens," filed Mar. 11, 2013, which is incorporated herein by reference in its entirety (including the Appendix) for all purposes.

BACKGROUND

Maintaining control over access to and the distribution of confidential data is an important part of a business' efforts to remain competitive. For this reason, much effort may be expended by a company in preventing a breach of its policies relating to data security. For example, trade secrets such as customer or prospective customer lists (which may include sales data, projections, etc.) have significant competitive value. They represent the result of many hours of effort to develop leads and establish business relationships. For this reason, employees with access to such data are in a position to significantly harm their employer should they decide to copy that information and provide it to a competitor.

While improper, such unauthorized copying and transfer of confidential data occurs because the data has significant economic value. Such actions may sometimes be done as part of obtaining a new job and/or increased compensation (such as by selling the data without changing jobs). As a result, the ability of an employee to access and copy such data may create an incentive for the employee to offer it to another company. The other company may be interested because having the list saves a competitor effort in developing their own customer relationships, and hopefully increases sales. It also provides them with a way to directly harm the rightful owner of the list by displacing the owner's sales to a customer. Typically, if such data is stolen, each person or entity on the customer or contact list may be contacted and solicited for business by the company in possession of the data. This may lead to new business and an opportunity to disparage the business of the original owner of the data.

Because of the significant economic value represented by trade secrets and other forms of confidential information, a company may invest a significant amount of resources in developing and enforcing data security programs for employees, vendors, and others with whom it may do business. Such programs may include ways of tracking data in an effort to determine if data has been stolen and transferred to an entity that is not entitled to have access to the data.

One method that has been developed to determine whether data has been obtained improperly is the use of what is termed a "honey token" (or honeytoken). A honey token is a name given to a set of techniques that may be used to identify when a person is in possession of information that they are not authorized to have. In some cases, a honey token may be used to alert the rightful owner of a set of data that it has been stolen, and to identify the unauthorized user. One example of a honey token is that of fake but apparently meaningful data that is inserted into a set of actual data. In this scenario the honey token represents a recognizable data string that can be distinguished from actual data by the proper owner of the data. Presumably, if such a token is discovered in a data set, it may be used to trace the origin of the data and determine the rightful owner, or provide proof that a person presently in possession of the data set obtained it in an improper manner. A honey token may also be inserted into a set of data with the goal of triggering an action by the unauthorized possessor of the data (such as the sending of an email). This may provide an indication to the actual owner that the data set has been stolen, and also the identity of the party now (wrongfully) in possession of the data.

However, currently known methods of using a honey token do not permit determining who specifically was responsible for the breach in data security, for example the employee who improperly copied and transferred the data. This information may be important in determining how access occurred, and confirming that the data was in fact misappropriated. Furthermore, if the person who was responsible for improperly transferring the data to another party becomes employed by or receives compensation from that party, then being able to positively identify that person may be necessary in order to hold them and their new employer accountable for the damage they caused to the rightful owner of the data (such as by filing a lawsuit seeking damages for misappropriation of trade secrets, unlawful competition, unfair business practices, receiving stolen property, or the like).

Conventional approaches to enhancing the security of confidential data do not provide an efficient way to trace the identity of a person who improperly accessed and/or transferred the data to a competitor. Embodiments of the invention are directed toward solving these and other problems individually and collectively.

SUMMARY

The terms "invention," "the invention," "this invention" and "the present invention" as used herein are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim. This summary is a high-level overview of various aspects of the inventive system and methods.

Embodiments of the invention are directed to systems and methods for enhancing the security of confidential data such as customer email lists or similar contact information. Specifically, the invention is directed to a method of inserting a form of data referred to as a honey token into a data set when it is accessed by a user (such as an employee of the rightful owner of the data). In contrast to conventional forms of such tokens, the inventive token is dynamically generated and includes information identifying the user (i.e., the party accessing the data). For example, in one embodiment, a token that includes the email address of a designated employee of the owner of the data (such as a person responsible for maintaining the security of data or a computer network) may be inserted into a contact list, where the inserted email address also includes data identifying the person who accessed the data (e.g., their ID number, the IP address of their work station, etc.). If the data set is later improperly transferred to another company, then that company may attempt to use the contact list to conduct business with the customers of the rightful owner of the data. If this occurs, then the designated employee of the rightful owner will receive an email whose address contains information that identifies the employee who misappropriated the data. This will assist authorities to more easily trace the stolen data (by providing confirmation of its source), as well as identify the person responsible for the theft.

Use of an embodiment of the invention may reduce misappropriation of trade secrets and confidential data, and thereby increase the security of such data. This is because the invention will make it riskier to attempt to steal protected data. As a result, it may reduce certain damaging transfers of employees between competitors since in the event of such a transfer, the invention can be used to provide proof of the theft should the data be stolen and used to contact a customer. This proof may be used to support bringing a lawsuit for trade secret misappropriation and/or receiving damages for the theft. As a result, use of the invention may create a disincentive for an employee to misappropriate such data and thereby enhance the overall level of security for such data.

In one embodiment, the invention is directed to a method for providing security for confidential data, where the method includes:
   determining that a user is attempting to access the confidential data;
   determining a type of contact data that is part of the confidential data;
   generating a token in a format of the type of the contact data, wherein the token further comprises
      a first data operative to enable routing of a message or communication to a location or a designated person; and
      a second data operative to identify the user;
   inserting the token into the confidential data;
   determining that the message or communication has been received at the location or by the designated person;
   processing one or more of the received message or communication, or data related to the message or communication; and
   based on the processing, identifying the user.

In another embodiment, the invention is directed to an apparatus for providing security for confidential data, where the apparatus includes:
   a processor programmed to execute a set of instructions;
   a data storage element in which the set of instructions are stored, wherein when executed by the processor the set of instructions cause the apparatus to
      determine that a user is attempting to access the confidential data;
      determine a type of contact data that is part of the confidential data;
      generate a token in a format of the type of the contact data, wherein the token further comprises
         a first data operative to enable routing of a message or communication to a location or a designated person; and
         a second data operative to identify the user;
      insert the token into the confidential data;
      determine that the message or communication has been received at the location or by the designated person;
      process one or more of the received message or communication, or data related to the message or communication; and
      based on the processing, identify the user.

In yet another embodiment, the invention is directed to method for providing security for confidential data, comprising:
   determining that a user is attempting to access the confidential data;
   generating a token in a format of a type corresponding to at least some of the confidential data, wherein the token further comprises
      a first data operative to enable routing of a message or communication to a location or a designated person; and
      a second data operative to identify the user;
   inserting the token into the confidential data;
   determining that the message or communication has been received at the location or by the designated person;
   processing one or more of the received message or communication, or data related to the message or communication; and
   based on the processing, identifying the user.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

This description discusses illustrative embodiments of the inventive system and methods. It is presented with reference to the accompanying drawings in order to provide a person having ordinary skill in the relevant art with a full, clear, and concise description of the subject matter defined by the claims which follow, and to enable such a person to appreciate and understand how to make and use the invention. However, this description should not be read to limit the scope of the claimed subject matter, nor does the presence of an embodiment in this description imply any preference of the described embodiment over any other embodiment, unless such a preference is explicitly identified herein. It is the claims, not this description or other sections of this document or the accompanying drawings, which define the scope of the subject matter to which the inventor and/or the inventor's assignee(s) claim exclusive entitlement.

Among other embodiments, the invention may be embodied in whole or in part as a system, as one or more processes, operations, methods, or functions, or as one or more apparatuses or devices. Embodiments of the invention may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, etc.) that is programmed with a set of executable instructions (e.g., software instructions), where the instructions may be stored in a suitable data storage element. The processor, microprocessor, CPU or controller may be a component or element of a computing device or data processing device or platform, such as a client device or a server used with an associated data storage element or database. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the invention are directed to systems, apparatuses, and methods for use in enhancing the security of confidential or proprietary data, such as customer contact data. Embodiments of the invention may be used to assist in determining that a set of contact information (such as a list of email addresses for customers or prospective customers) was improperly obtained by a competitor of the rightful owner, and also which employee of the rightful owner was responsible for the misappropriation. As a result, use of an embodiment of the invention is expected to create a disincentive for the theft of confidential data, thereby enhancing the security of such data. In the event that such data is wrongfully acquired, then the invention may be used to support recovering damages from the parties that acted improperly in copying, transferring, or receiving the data.

Embodiments of the invention may be implemented as part of any suitable application, operating system, data access control system, data storage device manager, computing device, data processing system, messaging system, data security process, data or data storage element access control protocol, system access control element or protocol, network security protocol, etc. In general, operation of an embodiment will be triggered by someone accessing confidential or proprietary information. When such an attempt at access occurs, an embodiment of the invention operates to insert a suitable honey token into the data set. The form and/or format of the inserted honey token may depend upon the type of data contained in the data set, for example, the form or type of contact data contained in the set.

In one embodiment, the data set includes a list of email addresses, such as might be found in a customer or prospective customer list. In such a case, the invention operates to insert an email address into the data set, where the inserted address includes two components: (a) an address corresponding to a designated employee of the rightful owner of the data who is responsible for maintaining security of the data; and (b) a data string or other form of data that may be used to identify the person accessing (and presumably improperly transferring) the data set.

In another embodiment, the data set includes contact information in the form of a list of phone numbers. In such a case the invention may operate to insert a phone number and extension into the data set, where the phone number is that of the designated employee of the rightful owner of the data and the extension represents data that may be used to identify the person accessing the data set (such as that person's employee ID number, a hash value corresponding to the last n digits of the person's social security number, the person's direct dial number, a randomly generated token that is uniquely associated with the person accessing the data set in the data storage system, etc.).

In general, an embodiment of the invention involves inserting some form of data into a data set containing confidential data, where the inserted data is sufficient to (a) cause a message or notification to be routed to a designated employee of the rightful owner of the data and (b) to identify the person who accessed (and presumably improperly transferred) the data. In some embodiments, the inserted data that causes the generation of (or generates) the message or notification may be a form of contact data (e.g., email address, phone number, or physical address). The data used to identify the person who accessed the data may be based on any suitable form or type of information, such as that person's employee ID number, the person's telephone extension, the last n digits of their social security number (e.g., an encrypted form of that number or a hash of the number), a randomly generated token that is uniquely associated with the person accessing the data set in the data storage system, or another suitable form of identifier.

Figure 1A:
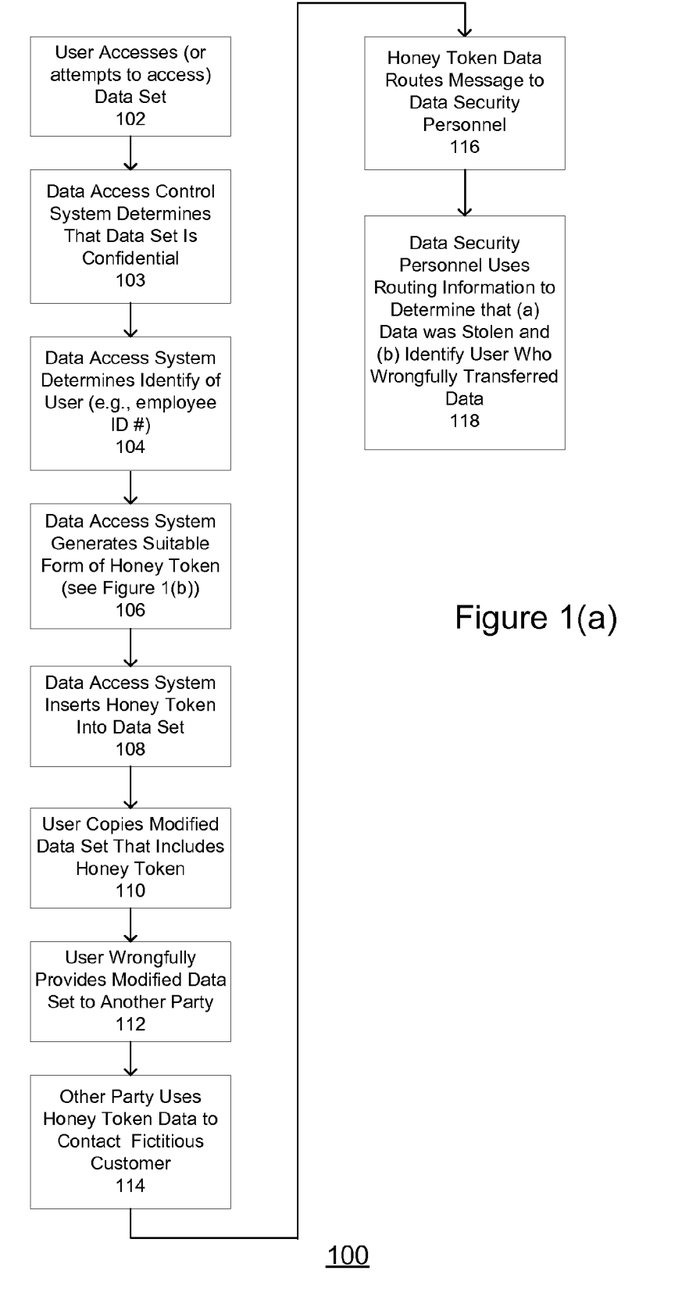
FIG. 1(a) is a flowchart or flow diagram illustrating a process, function, method, or operation 100 for implementing an embodiment of the invention.

FIG. 1 is a flowchart or flow diagram illustrating a process, function, method, or operation 100 for implementing an embodiment of the invention. As shown in the figure, operation of an embodiment of the invention may be initiated when an employee of the rightful owner of a data set accesses the data (step or stage 102). In one embodiment the data accessed is a list of customers or prospective customers, and the data includes contact information for those customers. The contact information may be of any suitable form, including but not limited to an email address, a phone number (mobile or landline), a mailing address corresponding to a physical location or post office box, a messaging account address, etc. It is presumed that the contact information will be used by a person who improperly receives the data to contact one or more of the customers or prospective customers, thereby initiating the tracking processes provided by the invention.

The data set represents confidential data that the rightful owner desires to keep private and prevent from being distributed to unauthorized entities. As a result, the data set is somehow identified as proprietary, protected, confidential, trade secret, or another suitable descriptive term. This may be done by setting a flag or other indicator in a file header or list of file characteristics. When the data set is accessed, the data access control system (such as an operating system or a specific software application that controls/enables access to a file system or data storage element) determines that the information being accessed is subject to restrictions regarding its distribution (step 103). This alerts the data access system to implement (or cause the implementation of) an embodiment of the invention.

In response to identifying the accessed data set or file (or other similar form of data) as being subject to restrictions, an embodiment of the invention is then implemented by determining the identity of the person accessing the data (step 104). This may be done by referring to previously submitted login data, the IP address of a device being used to request access to the data, or other suitable source. For purposes of the invention, the person's identity may then be represented by an employee ID number, social security number, last n digits of a social security number, telephone extension number, etc. (one or more of which may be obtained by a lookup of that information based on the login or other data).

The invention then generates a suitable honey token based on the type of contact data contained in the set (step 106), such as email address, phone number, or physical mailing address. In one embodiment, this means that the honey token has the same appearance and format as other contact data in the set. However, the honey token does not represent a real customer but is instead contact information for a designated employee of the rightful owner of the data to which has been added an encoded (or un-encoded) form of the data used to identify the person accessing the data set. The data used to identify the person accessing the data set is added in a way that does not interfere with the routing of a message or inquiry to the designated employee and preferably in a way that obfuscates the identifying data so that it is not recognized by the person accessing the data set.

Figure 1B:
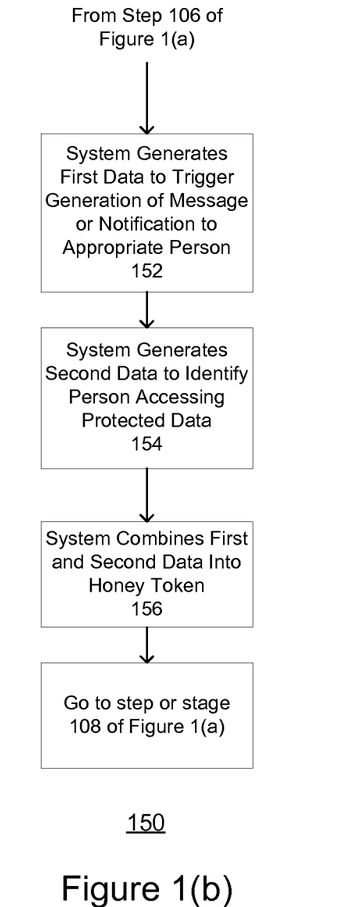
FIG. 1(b) is a flowchart or flow diagram illustrating a process, function, method, or operation 150 for generating a honey token that may be used in implementing an embodiment of the invention.

FIG. 1(*b*) is a flowchart or flow diagram illustrating a process, function, method, or operation 150 for generating a honey token that may be used in implementing an embodiment of the invention. As shown in the figure, process, function, method, or operation 150 will typically be executed following step or stage 106 of FIG. 1(*a*). At step or stage 152, the system or other relevant apparatus, controller, or device generates a first data for the honey token. This first data is of a type and form that operates to generate or permit delivery of a message or notification (e.g., by providing an address for the message) to an appropriate person or persons. As described herein, in some embodiments, this first data may be a form of contact data, such as an email address, post office box address, or telephone number, in which case it is assumed that the person who improperly acquired the data may use the contact data to contact customers or potential customers. In other embodiments the first data may be data or instruction(s) that cause a message or notification to be generated when processed by an operating system or suitable application (e.g., a browser, spreadsheet, word processing program, etc.).

At step or stage 154 the system or other relevant apparatus, controller, or device generates a second data for the honey token. This second data is of a type and form that operates to identify the person who accessed the protected data. As described herein, in some embodiments, this second data may be an employee ID number, a processed form of such a number (e.g., a hash or encrypted form), personal data that is associated with the employee (e.g., a telephone extension or office number, a portion of the employee's social security number or driver's license), or other suitable identifier.

At step or stage 156 the system or other relevant apparatus, controller, or device forms the completed honey token by combining the first data and the second data into the appropriate format. This may include inserting the first and/or second data into specific fields, placing the two data into a single address, string, or format, etc. After completed construction of the honey token, control passes to step or stage 108 of FIG. 1(*a*).

The created honey token is then inserted into the data set (step 108) in the same format, fields, locations, etc. as the contact data in the data set. This should make the token indistinguishable from the real contact data. As noted, the token will typically include two components: (1) contact information for a designated employee of (or someone authorized by) the rightful owner of the data (for example, this person may be the head of the data security or IT function, a member of the security team, an attorney, an outside consultant, etc.); and (2) information sufficient to enable identification of the person who accessed the data set, preferably in a form that is not recognizable as identification data.

The contact information for the designated employee or consultant may correspond to the actual contact information for the designated employee/consultant of the rightful owner (such as their actual email address), but more conveniently, may be a separate email account corresponding to the rightful owner's email domain, where the separate account has a fictitious name and is used for tracking the unauthorized release of data. The information used to enable identification of the person who accessed the data set may be that person's employee number (or preferably, in order to avoid raising suspicion, a hash, encryption, or other modification of that number), the IP address of the device used to access the data, the person's telephone extension, or other suitable information that may be used to identify the person who accessed the data, etc. The person's employee number may be obtained after performing a suitable database "lookup" based on the login of the person who is accessing the data set or network, the IP address of the device used for the access, etc. The identifying information may be appended to the contact information, inserted into the contact information in a predetermined manner that will not prevent proper delivery of a message to that contact address, or associated with the contact information in any suitable manner.

Several examples of the process of generating a suitable honey token will now be described. It is noted that these are presented for purposes of explaining one or more embodiments of the invention and are not meant to be exhaustive examples, nor limit the possible embodiments of the invention. The examples assume that contact information may be used as a form of data inserted into the actual data set (either because the actual data includes contact data or because the contact data may be inserted in a form that would not give rise to suspicion).

In one embodiment, if the contact information in a data set is an email address, then a suitable implementation of an embodiment of the invention would be to insert a honey token of the form shown below into the data set:

John Smith—jsmith948@exampledomain.com, where

"John Smith" is the name of a fictitious contact or customer;

"exampledomain.com" is a fictitious domain set up by the rightful owner of the data so that email messages sent to that domain are routed to the designated employee of the rightful owner who is responsible for data security; and "948"—this string corresponds to the person who accessed the data and is sufficient to identify them. As noted, it may represent the person's employee ID, a hash or encrypted version of that data, or other suitable data.

Note that if the data set is copied and wrongfully provided to another party (as illustrated in steps 110 and 112 of FIG. 1), and that party then attempts to use the contact information to contact customers, an email will be sent to the inbox corresponding to "jsmith948" (step 114). The email domain (exampledomain.com) could be set up as a "catch-all" so that a message sent to any address at that domain, "anything@exampledomain.com" would be routed to the same address (i.e., to the same email inbox). A benefit of this approach is that the sender would not be aware that this process would be occurring. The recipient of the message (e.g., the employee/consultant of the rightful owner) would see the actual address that the email was sent to, thereby enabling identification of the person who wrongfully copied the data. Thus, the email message will be received in an inbox where a portion of the email address will enable identification of the person who accessed and presumably improperly transferred the protected data (step 116). This will allow the head of data security to determine both that the confidential data was misappropriated (as well as the likely source of the message via the originating email domain), and the identity of the person who committed the wrongful action (as suggested by steps 116 and 118).

In another embodiment, the contact information is in the form of a phone number. In this situation a suitable implementation of an embodiment of the invention would be to insert a honey token of the form shown below into the data set:
John Smith—(123) 456-7890 x 948, where
"John Smith" is the name of a fictitious contact or customer;
"(123) 456-7890" is a fictitious phone number set up by the rightful owner of the data so that any phone call to that number (regardless of the extension) is routed to a voicemail inbox or collection point for the designated employee/consultant of the rightful owner; and
"948"—this string corresponds to the person who accessed the data and is sufficient to identify them. As noted, it may represent the person's employee ID, a hash or encrypted version of that data, or other suitable identifier.

Note that if the data set is provided to another party and that party then attempts to use the contact information to contact customers, a call will be placed to a number corresponding to the designated employee of the rightful owner. Further, the call will be routed to a voicemail inbox corresponding to extension 948 (or will otherwise be associated with the person who accessed the data), which enables identification of the person who accessed and wrongfully transferred the data. This will allow the head of data security to determine both that the confidential data was misappropriated (as well as the likely source of the call via caller ID or a similar process), and the identity of the person who committed the wrongful action.

In yet another embodiment, the contact information is in the form of a mailing address corresponding to a post office box. In this situation a suitable implementation of an embodiment of the invention would be to insert a honey token of the form shown below into the data set:
John Smith—P.O. Box 948, Los Angeles, Calif. 90001, where
"John Smith" is the name of a fictitious contact or customer;
"948"—this string corresponds to the person who accessed the data and is sufficient to identify them. As noted, it may represent the person's employee ID, a hash or encrypted version of that data, or other suitable identifier; and
the rightful owner of the data has rented a P.O. box and arranged for all mail addressed to a range of P.O. box numbers to be delivered to the rented box. Note that due to the cost of renting a P.O. Box (or Boxes), it may be preferable to use some form of private mail delivery company to enable delivery of mail addressed to multiple box addresses to a single box or account. In the situation where only a limited number of people have access to the data, this may be cost-effective since only a small number of P.O boxes may need to be rented. A variation of this embodiment is to use contact data of the following form;
John Smith—c/o John Smith (948), P.O. Box 1, Los Angeles, Calif. 90001, where the name of the contact now incorporates the identifying information so that a single P.O. box may be used more easily.

Note that if the data set is provided to another party and that party then attempts to use the contact information to contact customers, a letter or other form of message will be delivered to the specified mail box. The address will provide the information needed to identify the person who wrongfully transferred the data. This will allow the head of data security to determine both that the confidential data was misappropriated, and the identity of the person who committed the wrongful action.

Note that the previous examples of embodiments of the invention have described use of a numeric ID as the part of a honey token which identifies the person who accessed (and presumably improperly transferred) the protected data. However, a method to generate what may be more naturally appearing tokens (and hence tokens that may be less likely to arouse suspicion) would be as follows:

(1) Take the top 1000 first names and 5000 last names from U.S. Census data and insert them each into their own SQL database table in randomized order. Then generate a Cartesian joining of the two, resulting in 5,000,000 unique combinations of names in an ordered list. If a longer list is needed, the US Census publishes the top ~3000 first names and ~150,000 last names, resulting in a potential set of ~450,000,000 unique tokens.

(2) An example SQL to generate such a honey token table would be the following:
insert into honeytokennames(id, firstname, lastname)
select rownum, firstnames.name, lastname.name
from firstnames, lastnames,
where "firstnames" and "lastnames" are the randomly ordered names from the census data.
The result will be a table of the form:
id, firstname, lastname
1, John, Smith
2, Bill, Smith
3, Carol, Smith
. . .
1001, John, Johnson
1002, Bill, Johnson
1003, Carol, Johnson,
etc.

In this example, instead of having an email address or PO Box with a numeric ID, the numeric ID (e.g., corresponding to the person's employee ID or other identifier) is used to look up a name in the honey token names table (e.g., if the employee ID is #1002, then the honey token would contain the name "Bill Johnson" as the intended recipient of the message). The name to which the message, letter, or call was directed may therefore appear more legitimate than that generated from other possible methods. An email address would be generated in the same way (e.g., bill_johnson@exampledomain.com), so as to appear authentic. This technique is effective because it can be used for any contact method (email, postal mail, fax, phone, etc.), assuming that the name is included in the message.

An embodiment of the invention will typically be implemented in the form of a set of software instructions that are executed by a suitably programmed processor, microprocessor, central processing unit (CPU), data processor, computing device, etc. Such a programmed element or component will typically be operated by the rightful owner of the data or by a data or network security provider, and may be incorporated into a data access controller, data access program or function, operating system, a file management element or component, a file management function, a data storage element controller or process, a network access controller, or another suitable aspect of an operating system, computing device, data processing device, data processing platform, or network.

Figure 2:
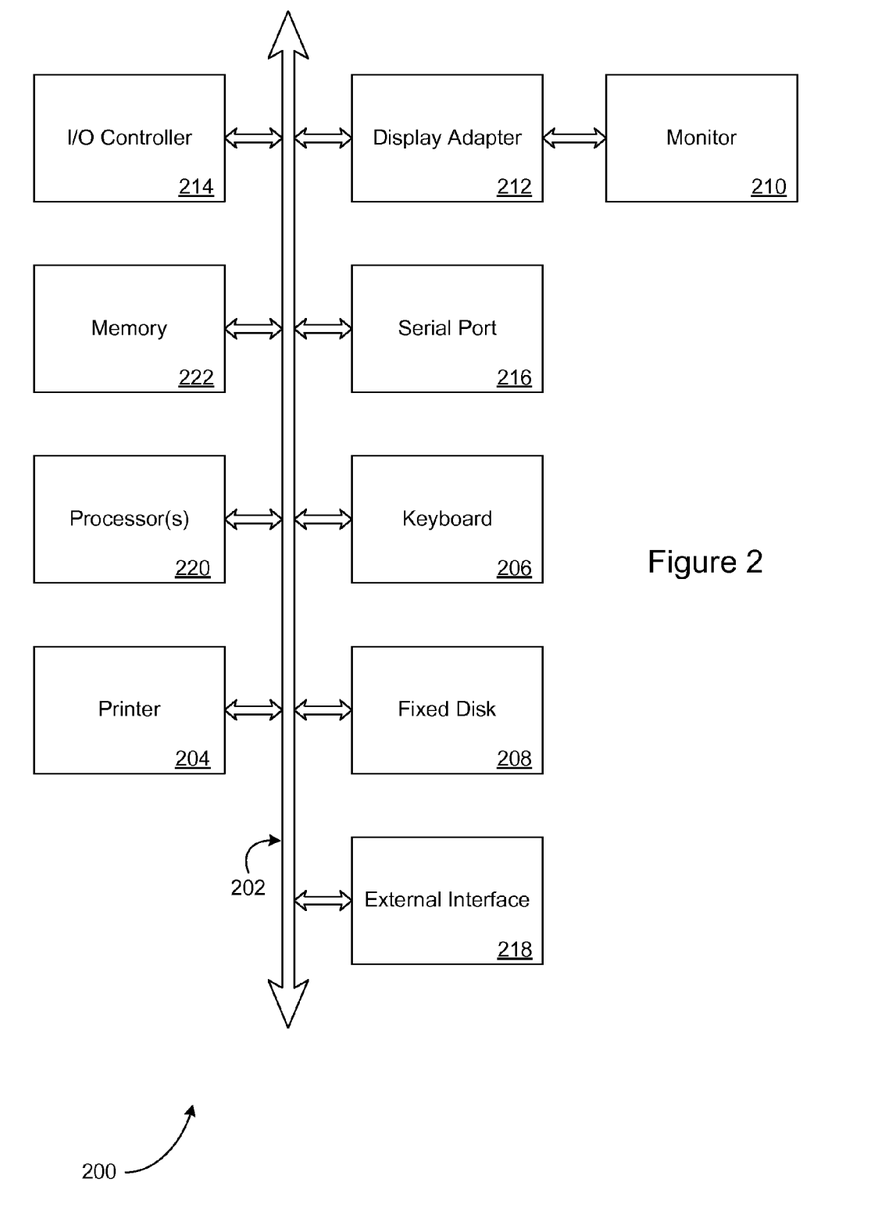
FIG. 2 is a diagram illustrating elements or components that may be present in a computing or data processing device or system configured to implement a process, function, method, or operation in accordance with an embodiment of the present invention.

In accordance with at least one embodiment of the invention, the system, apparatus, methods, processes, function, or operations for enhancing data security by use of a dynamic honey token may be wholly or partially implemented in the form of a set of instructions executed by one or more programmed computer processors such as a central processing unit (CPU), controller, or microprocessor. Such processors may be incorporated in an apparatus, server, system or data access point, client device, or other computing or data processing device operated by, or in communication with, other components of a system. As an example, FIG. 2 is a diagram illustrating elements or components that may be present in a computing or data processing device or system configured to implement a process, function, method, or operation in accordance with an embodiment of the present invention. The subsystems shown in FIG. 2 are interconnected via a system bus 202. Additional subsystems include a printer 204, a keyboard 206, a fixed disk 208, and a monitor 210, which is coupled to a display adapter 212. Peripherals and input/output (I/O) devices, which couple to an I/O controller 214, can be connected to the computer system by any number of means known in the art, such as a serial port 216. For example, the serial port 216 or an external interface 218 can be utilized to connect the computer device 200 to further devices and/or systems not shown in FIG. 2, including a wide area network such as the Internet, a mouse input device, and/or a scanner. The interconnection via the system bus 202 allows one or more processors 220 to communicate with each subsystem and to control the execution of instructions that may be stored in a system memory 222 and/or the fixed disk 208, as well as the exchange of information between subsystems. The system memory 222 and/or the fixed disk 208 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A computer-implemented method, comprising:
   determining that a user is attempting to access confidential data stored on a computing platform;
   determining a type of contact data that is part of the confidential data;
   generating a token in a format of the type of the contact data, wherein the token further comprises
      a first data operative to enable routing of a message or communication to a location or a designated person; and
      a second data operative to identify the user, the second data appended to the first data;
   storing the token with the confidential data in response to the attempt to access;
   receiving the message or communication at the location or by the designated person;
   processing one or more of the received message or communication, or data related to the message or communication to retrieve the second data; and
   in response to retrieving the second data, identifying the user;
   wherein processing one or more of the received message or communication, or data related to the message or communication further comprises processing the received message or communication, or data related to the message or communication to determine the user based on the address to which the message or communication is sent or the phone number or phone number extension at which the message or communication is received.

2. The method of claim 1, wherein determining a type of contact data that is part of the confidential data further comprises determining that the confidential data includes one or more email addresses, phone numbers, or physical addresses.

3. The method of claim 1, wherein generating a token in a format of the type of the contact data further comprises generating a token that includes one or more of an email address, a phone number, or a physical address.

4. The method of claim 1, wherein the second data is one or more of an identification number, a phone number or phone number extension, or an identifier associated with personal data of the user.

5. The method of claim 1, wherein the second data includes a processed form of one or more of an identification number, a phone number or phone number extension, or an identifier associated with personal data of the user.

6. The method of claim 5, wherein the processed form is a hash, encoding, or encryption of one or more of the identification number, the phone number or phone number extension, or the identifier associated with personal data of the user.

7. An apparatus, comprising:
a processor programmed to execute a set of instructions;
a data storage element in which the set of instructions are stored, wherein when executed by the processor the set of instructions cause the apparatus to
determine that a user is attempting to access confidential data stored on a computer platform;
determine a type of contact data that is part of the confidential data;
generate a token in a format of the type of the contact data, wherein the token further comprises
a first data operative to enable routing of a message or communication to a location or a designated person; and
a second data operative to identify the user, the second data appended to the first data;
store the token with the confidential data on the computing platform;
determine that the message or communication has been received at the location or by the designated person;
process one or more of the received message or communication, or data related to the message or communication to retrieve the second data; and
identify the user in response to retrieving the second data;
wherein processing one or more of the received message or communication, or data related to the message or communication further comprises processing the received message or communication, or data related to the message or communication to determine the user based on the address to which the message or communication is sent or the phone number or phone number extension at which the message or communication is received.

8. The apparatus of claim 7, wherein determining a type of contact data that is part of the confidential data further comprises determining that the confidential data includes one or more email addresses, phone numbers, or physical addresses.

9. The apparatus of claim 7, wherein the second data is one or more of an identification number, a phone number or phone number extension, or an identifier associated with personal data of the user.

10. The apparatus of claim 7, wherein the second data includes a processed form of one or more of an identification number, a phone number or phone number extension, or an identifier associated with personal data of the user.

11. The apparatus of claim 10, wherein the processed form is a hash, encoding, or encryption of one or more of the identification number, the phone number or phone number extension, or the identifier associated with personal data of the user.

12. A computer-implemented method, comprising:
determining that a user is attempting to access confidential data stored on a computing platform;
generating a token in a format of a type corresponding to at least some of the confidential data, wherein the token further comprises
a first data operative to enable routing of a message or communication to a location or a designated person; and
a second data operative to identify the user, the second data appended to the first data;
storing the token with the confidential data on the computing platform;
determining that the message or communication has been received at the location or by the designated person;
processing one or more of the received message or communication, or data related to the message or communication to retrieve the second data; and
in response to retrieving the second data, identifying the user;
wherein the identifying further comprises processing the received message or communication, or data related to the message or communication to determine the user based on the address to which the message or communication is sent or the phone number or phone number extension at which the message or communication is received.

13. The method of claim 12, wherein the confidential data includes one or more email addresses, phone numbers, or physical addresses and generating the token in a format of a type corresponding to at least some of the confidential data further comprises generating the token in a format that includes one or more of an email address, a phone number, or a physical address.

14. The method of claim 12, wherein the second data is one or more of an identification number, a phone number or phone number extension, or an identifier associated with personal data of the user.

15. The method of claim 12, wherein the second data includes a processed form of one or more of an identification number, a phone number or phone number extension, or an identifier associated with personal data of the user.

16. The method of claim 15, wherein the processed form is a hash, encoding, or encryption of one or more of the identification number, the phone number or phone number extension, or the identifier associated with personal data of the user.

* * * * *